United States Patent
Bo et al.

(10) Patent No.: US 12,481,887 B2
(45) Date of Patent: Nov. 25, 2025

(54) EFFICIENT MACHINE LEARNING MODEL INFERENCE

(71) Applicant: International Business Machines Corporation, Armonk, NY (US)

(72) Inventors: Song Bo, Xian (CN); Dong Hai Yu, Xian (CN); Jun Wang, Xian (CN); Jiang Bo Kang, Xian (CN); Yao Dong Liu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 17/453,565

(22) Filed: Nov. 4, 2021

(65) Prior Publication Data

US 2023/0138987 A1 May 4, 2023

(51) Int. Cl.
*G06N 3/082* (2023.01)
*G06N 20/20* (2019.01)

(52) U.S. Cl.
CPC .............. *G06N 3/082* (2013.01); *G06N 20/20* (2019.01)

(58) Field of Classification Search
CPC .......... G06N 3/082; G06N 20/20; G06N 3/02; G06N 20/00; G06N 5/01
USPC .......................................................... 706/12
See application file for complete search history.

(56) References Cited

U.S. PATENT DOCUMENTS

| | | | |
|---|---|---|---|
| 11,823,077 B2 | 11/2023 | Yu et al. | |
| 2011/0320767 A1 | 12/2011 | Eren | |
| 2017/0132141 A1 | 5/2017 | Allen | |
| 2019/0332525 A1 | 10/2019 | Anghel | |
| 2020/0151610 A1 | 5/2020 | Chueh | |
| 2021/0004712 A1 | 1/2021 | Sarferaz | |
| 2021/0279753 A1* | 9/2021 | Saarenvirta | G06Q 10/067 |
| 2022/0076164 A1* | 3/2022 | Conort | G06N 20/00 |
| 2022/0284657 A1* | 9/2022 | Müller | G06N 3/084 |

(Continued)

FOREIGN PATENT DOCUMENTS

| | | | |
|---|---|---|---|
| WO | 2020068978 A1 | 4/2020 | |
| WO | 2020102215 A1 | 5/2020 | |

OTHER PUBLICATIONS

Lei et al., "Learn to Cache: Machine learning for network edge caching in the big data era", IEEE Wireless Communications, Jun. 2018 (Year: 2018).*

(Continued)

*Primary Examiner* — Tsu-Chang Lee
(74) *Attorney, Agent, or Firm* — Randy Tejeda

(57) ABSTRACT

One or more computer processors calculate a cache prediction for a received inference request within an inference cache structured as a self-learning tree, wherein the inference request comprises a set of input values. The one or more computer processors responsive to the retrieved cache prediction exceeding a cache prediction threshold, transmit the cache prediction. The one or more computer processors parallel compute a model prediction for the received inference request utilizing a trained model. The one or more computer processors responsive to the retrieved model prediction exceeding a model prediction threshold, convert the trained model into a tree structure. The one or more computer processors update the inference cache with the converted train model. The one or more computer processors transmit the model prediction.

20 Claims, 5 Drawing Sheets

(56) References Cited

U.S. PATENT DOCUMENTS

2022/0284658 A1* 9/2022 Müller .................. G06N 3/084

OTHER PUBLICATIONS

International Search Report and Written Opinion for Application No. PCT/CN2022/123775 dated Nov. 25, 2022, 9 pages.
"Minimizing real-time prediction serving latency in machine learning", Last updated Nov. 16, 2020, 21 pages, <https://cloud.google.com/solutions/machine-learning/minimizing-predictive-serving-latency-in-machine-learning>.
Balasubramanian et al., "Accelerating Deep Learning Inference via Learned Caches", arXiv:2101.07344v1 [cs.LG] Jan. 18, 2021, 21 pages.
Cruchant, Oliver, "Faster, Cheaper, Leaner: improving real-time ML inference using Apache MXNet", Jan. 8, 2020, 10 pages, <https://medium.com/apache-mxnet/faster-cheaper-leaner-improving-real-time-ml-inference-using-apache-mxnet-2ee245668b55>.
Guo et al., "FoggyCache: Cross-Device Approximate Computation Reuse", MobiCom '18, © 2018, 16 pages, <https://dl.acm.org/doi/10.1145/3241539.3241557>.

\* cited by examiner

EFFICIENT MACHINE LEARNING MODEL INFERENCE

BACKGROUND

The present invention relates generally to the field of machine learning, and more particularly to machine learning inferences.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

SUMMARY

Embodiments of the present invention disclose a computer-implemented method, a computer program product, and a system. The computer-implemented method includes one or more computer processers calculating a cache prediction for a received inference request within an inference cache structured as a self-learning tree, wherein the inference request comprises a set of input values. The one or more computer processors responsive to the retrieved cache prediction exceeding a cache prediction threshold, transmit the cache prediction. The one or more computer processors parallel compute a model prediction for the received inference request utilizing a trained model. The one or more computer processors responsive to the retrieved model prediction exceeding a model prediction threshold, convert the trained model into a tree structure. The one or more computer processors update the inference cache with the converted train model. The one or more computer processors transmit the model prediction.

BRIEF DESCRIPTION OF THE DRAWINGS

Figure (i.e., FIG. 1 is a functional block diagram illustrating a computational environment, in accordance with an embodiment of the present invention.

DETAILED DESCRIPTION

Modern organizations have developed advanced analysis techniques, such as ensemble methods, deep neural networks, etc., in order to satisfy increasing demand for prediction accuracy. Commonly, organization utilize ensemble trees as a prediction method, but ensemble trees require significant computational resources as the trees grow large and may contain thousands of base models. For example, typical ensemble trees comprise more than two thousand individual decision trees, where the size of each component model is greater than four gigabytes. As model complexity increases, associated model analysis introduces increased computational overhead, which in turn requires increased computational inference time. In many industries, this increased computational inference time impedes or disrupts critical components that require low latency operations. Traditional methods (e.g., parallel computing, hardware acceleration, model reduction, etc.) focus on model inference optimization itself often causing bottlenecks due to the computational constraints.

Embodiments of the present invention improve current analysis techniques by improving inference performance through an inference cube system. Embodiments of the present invention recognize that computational inference time or duration is reduced through the created inference cube system utilizing computational space (e.g., storage capacity) to reduce said inference time. Embodiments of the present invention comprise a data cache system with historical records (i.e., inputs, input values, input sets, etc.) and associated inferences (i.e., predictions, results, associations, etc.). Embodiments of the present invention comprise an inference cache system utilizing effective tree structure that reduces computational requirements by dynamically maintaining tree data based on computational restrictions while allowing fast inference search. Embodiments of the present invention recognize that the fast inference search requires less computational time than prediction computations through a trained machine learning model (e.g., neural network). Implementation of embodiments of the invention may take a variety of forms, and exemplary implementation details are discussed subsequently with reference to the Figures.

The present invention will now be described in detail with reference to the Figures.

Figure 1:
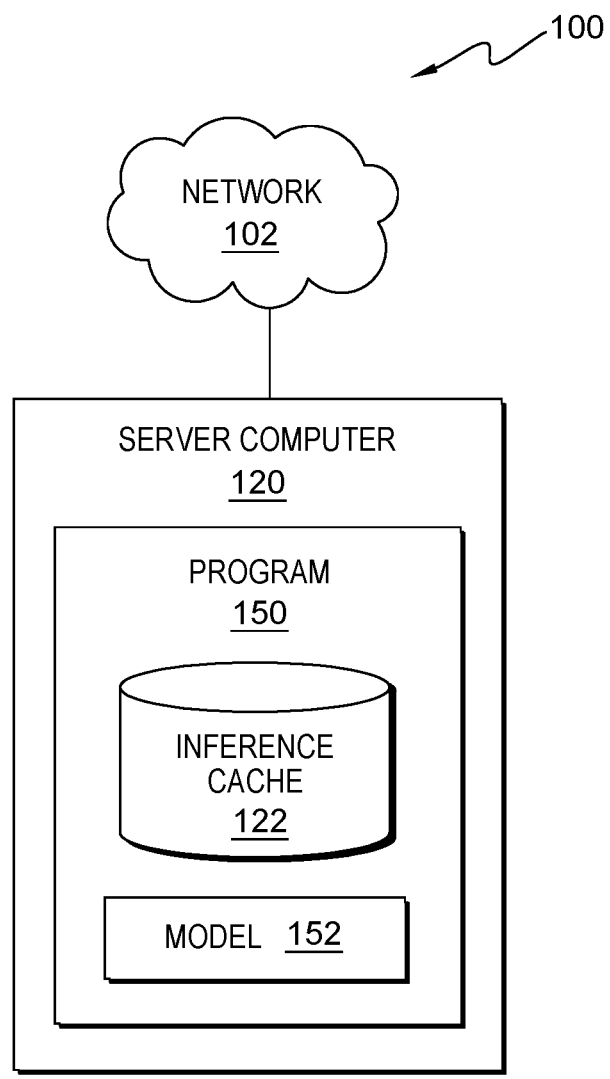

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes inference cache 122 and program 150. In other embodiments, server computer 120 may contain other applications, databases, programs, etc. which have not been depicted in computational environment 100. Server computer 120 may include internal and external hardware components, as depicted and described in further detail with respect to FIG. 5.

Figure 3:
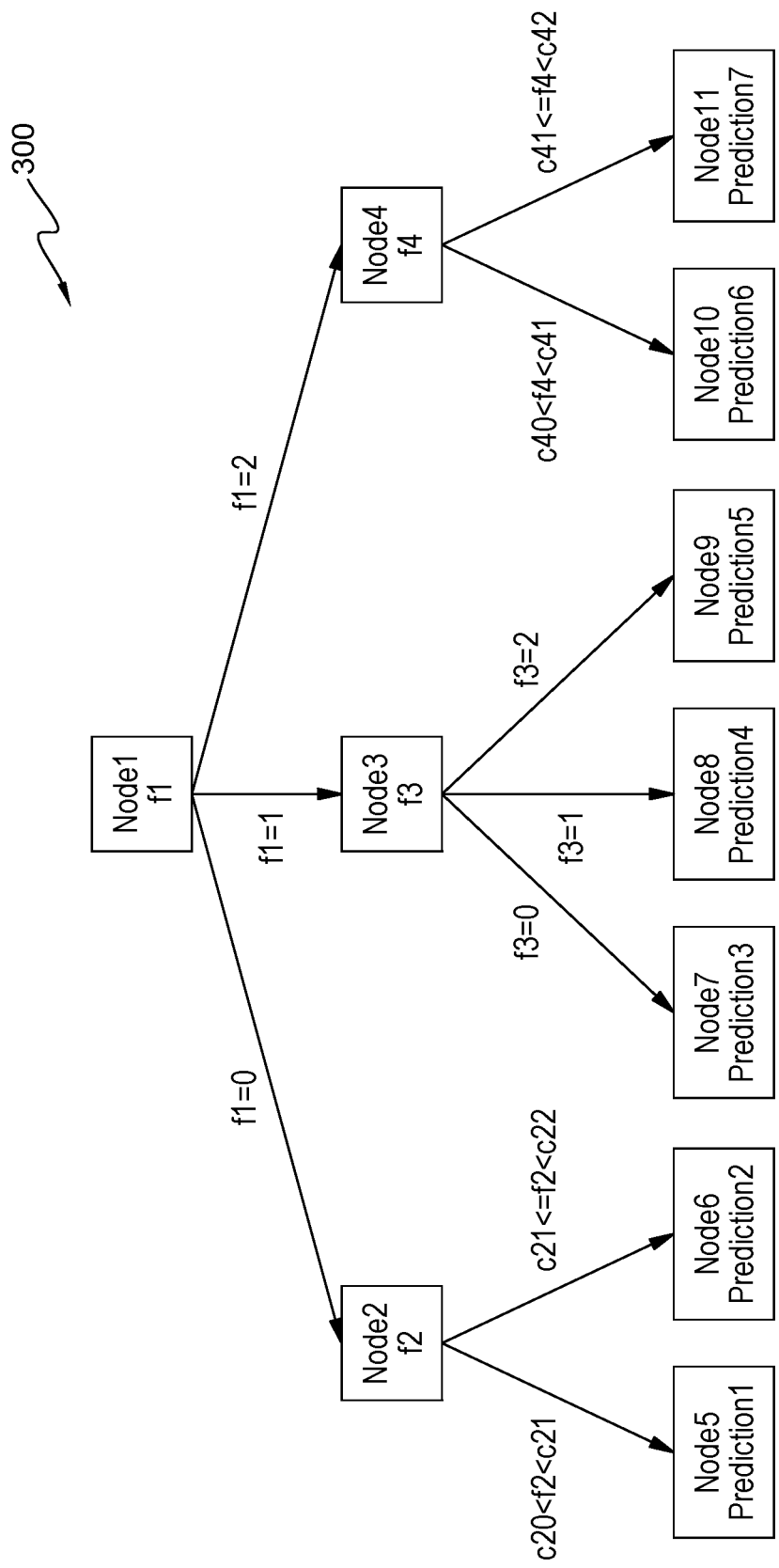
FIG. 3 is a diagram of a tree structure within an inference cache of the server computer, in accordance with an embodiment of the present invention.
Figure 4:
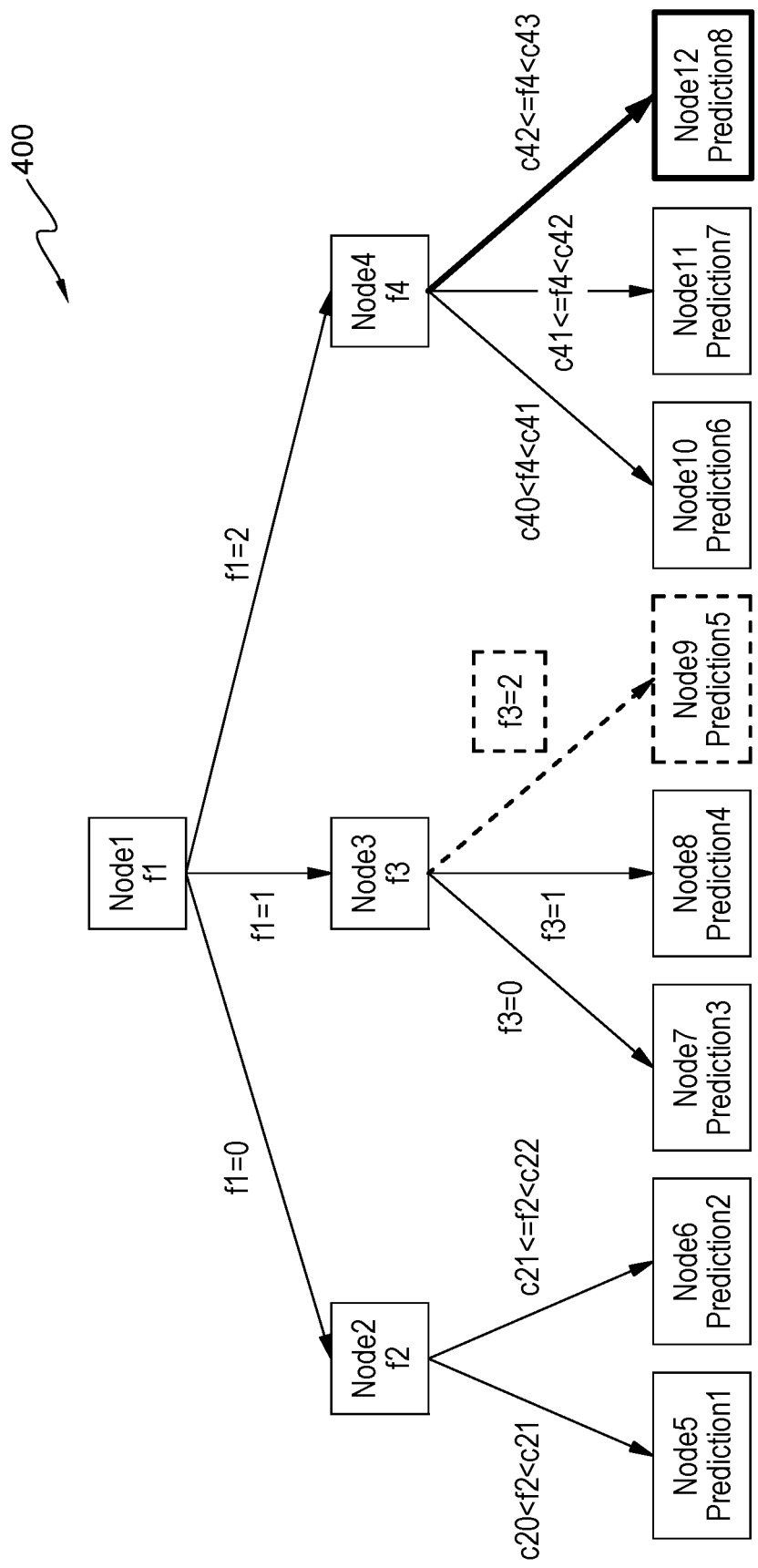
FIG. 4 is a diagram of a self-learning tree structure within the inference cache of the server computer, in accordance with an embodiment of the present invention.

Inference cache 122 is a repository for data used by program 150. In the depicted embodiment, inference cache 122 resides on server computer 120. In another embodiment, inference cache 122 may reside elsewhere within computational environment 100 provided program 150 has access to inference cache 122. A database is an organized collection of data. Inference cache 122 can be implemented with any type of storage device capable of storing data and configuration files that can be accessed and utilized by program 150, such as a database server, a hard disk drive, or a flash memory. In an embodiment, inference cache 122 stores data used by program 150, such as historical records (e.g., inference request, inputs, etc.) with associated inference results (e.g., predictions, historical results, etc.) and confidence values, etc. In an embodiment, inference cache 122 is a data cache system in which inference results are determined by a plurality of records comprised of input values, where once the input values are defined the result is also defined. In an embodiment, inference cache 122 is comprised of a tree structure (e.g., decision, ensemble, random forest, gradient boosting, etc.), allowing fast and minimal computational predictions through tree model inference techniques. In this embodiment, program 150 utilizes inference cache 122 to predict a target variable (i.e., inference) from a set of input values or variables with associated attributes. In an embodiment, program 150 converts a predictive model to a tree structure and stores the tree within inference cache 122. In this embodiment, each comprised non-leaf node is an input split and each comprised leaf node is associated with a prediction or inference. In this embodiment, every input split partitions input values into feature regions. In a further embodiment, inference cache 122 is comprised of a self-learning tree, where the tree structure is dynamically adjusted based on input values. For example, nodes (i.e., input splits and predictions) are added to improve the inference accuracy as input values are collected. FIGS. 3 and 4 further describe the tree structure of inference cache 122. In another example, nodes are reduced or removed due to node inactivity, prediction inaccuracy, storage limitations, and/or computational limitations. In the above embodiments, program 150 constructs inference cache 122 utilizing every possible input combination based on input metadata or utilizing real-world input predictions.

Program 150 is a program for inference cube predictions. In various embodiments, program 150 may implement the following steps: calculate a cache prediction for a received inference request within an inference cache structured as a self-learning tree, wherein the inference request comprises a set of input values; responsive to the retrieved cache prediction exceeding a cache prediction threshold, transmit the cache prediction; parallel compute a model prediction for the received inference request utilizing a trained model; responsive to the retrieved model prediction exceeding a model prediction threshold, convert the trained model into a tree structure; update the inference cache with the converted train model; and transmit the model prediction. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes model 152. Program 150 is depicted and described in further detail with respect to FIG. 2.

Model 152 is representative of a model utilizing deep learning techniques to train, calculate weights, ingest inputs, and output a plurality of solution vectors. In an embodiment, model 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. The training of model 152 is depicted and described in further detail with respect to FIG. 2.

The present invention may contain various accessible data sources, such as inference cache 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
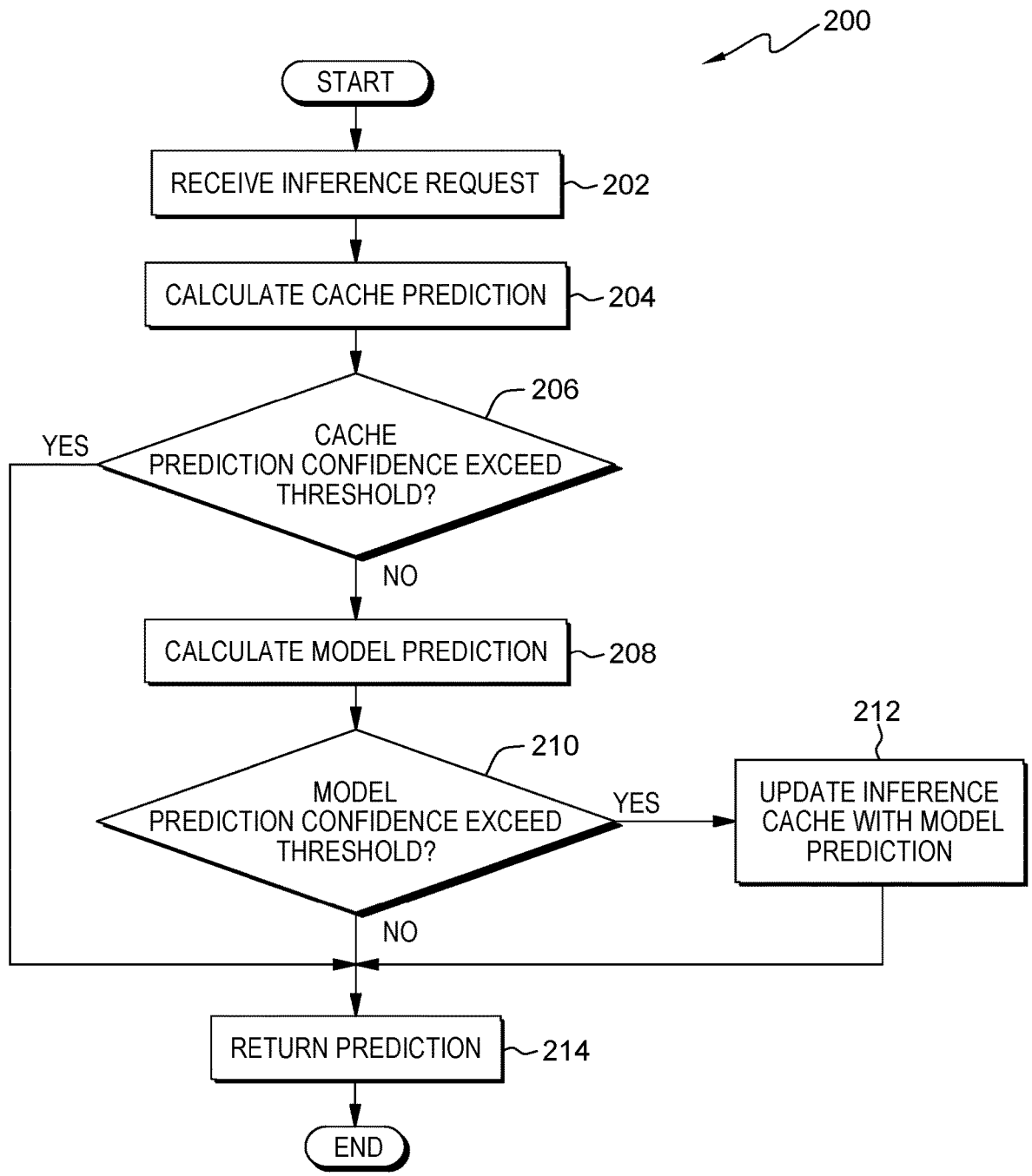
FIG. 2 is a flowchart depicting operational steps of a program, on a server computer within the computational environment of FIG. 1, for inference cube predictions, in accordance with an embodiment of the present invention.

FIG. 2 depicts flowchart 200 illustrating operational steps of program 150 for inference cube predictions, in accordance with an embodiment of the present invention.

Program 150 receives an inference request (step 202). In an embodiment, program 150 initiates responsive to a received inference request. In this embodiment, the inference request comprises a set of inputs that contain categorical or continuous values. Program 150 extracts metadata associated with the set of inputs, such as comprised categorical values encoded by an ordinal encoder resulting in a single column of integer values for each contained feature. Additionally, program 150 encodes continuous values utilizing a binning encoder with an array of cut-points, where program 150 extracts the cut-points from historical data and dynamically adjusts the cut-points based on input values. Here, program 150 places input values into groups associated with a value representative of that interval (i.e., cut-points). Responsive to the extracted metadata of the set of inputs, program 150, parallelly, initiates a cache prediction computation, as described in step 204, and a model prediction computation, as described in step 208.

Program 150 calculates a cache prediction (step 204). In an embodiment, program 150 utilizes inference cache 122 to calculate the cache prediction based on the extracted metadata from a set of inputs comprised in the received inference request. In this embodiment, program 150 calculates an input metadata similarity score or value based on a comparison of the metadata associated with the set of inputs in the retrieved inference request and historical inputs stored in inference cache 122. Program 150 utilizes the calculated similarity score (e.g., Euclidean distance, log-likelihood distance, etc.) to retrieve one or more historical predictions, stored within inference cache 122, associated with one or more similarity historical input sets. In a further embodiment, program 150 utilizes variable importance to compute similarity, where input values with more importance (e.g., common features, focused image areas, etc.) have more weight. In an embodiment, program 150 measures the confidence of the retrieved inference based on the calculated similarity between the input set and historical inputs contained in inference cache 122. For example, a confidence value of 1.0 signifies the presence of a cached record that matches the input set, while a confidence value of 0.0 signifies that no cached records match or are similar to the input set. The cache prediction calculated is based on a fast search pattern, due to the tree structure of inference cache 122, that returns a prediction faster than a model prediction as described in step 208.

If the cache prediction does not exceed a cache threshold ("no" branch, decision block 206), then program 150 calculates a model prediction (step 208). In an embodiment, program 150 feeds the input values into model 152 and calculates a model prediction. In this embodiment, program 150 utilizes model 152 to assess the input set contained in the retrieved inference request utilizing a training set (i.e., inference cache 122) of labelled historical inferences and assigns weights to the various input values, program 150 utilizes model 152 to assign an inference and calculate a probability of the likelihood of said inference.

If the model prediction exceeds a model threshold ("yes" branch, decision block 210), then program 150 updates the cache with the model prediction (step 212). Responsive to the calculated model prediction from step 208 exceeding a model prediction confidence threshold, program 150 updates inference cache 122 with the calculated model prediction and metadata associated with the input values comprised within the inference request. Here, program 150 converts model 152 into a predictive tree and stores the predictive tree in inference cache 122. In an embodiment, program 150 converts model 152 into a "soft" decision tree in which leaves are assigned an inference probability and all leaves contribute equally to an inference or prediction. Responsive to an updated inference cache 122, program 150 balances or restructures inference cache 122 subject to any computational or storage constraints. For example, program 150 removes inaccurate (e.g., <90% predictive accuracy) leaves or entire nodes in order to reduce storage space while maintaining highly accurate predictions.

If the cache prediction does not exceed the cache threshold ("no" branch, decision block 206) or if the model prediction does not exceed the model threshold ("no" branch, decision block 210), then program 150 returns a prediction (step 214). In an embodiment, program 150 returns the cache prediction or model prediction to a user or another application for utilization in a subsequent workload. Here, program 150 returns the prediction that is most accurate or the prediction with the highest confidence value. In an embodiment, program 150 transmits or presents the prediction to the user. For example, program 150 presents a calculated cache prediction along with an associated confidence value on a user display. In another embodiment, program 150 utilizes the prediction to classify a set of similar input values, for example, a set of similar images.

FIG. 3 depicts a diagram containing tree structure 300 of a tree structure cached within inference cache 122, in accordance with an embodiment of the present invention. Tree structure 300 contains a plurality of nodes comprising non-leaf or split nodes (i.e., Node1, Node2, Node3, and Node4), where each split node comprises a plurality of leaf nodes (i.e., Node5-Node11). Each comprised non-leaf node is an input split and each leaf node is associated with a prediction or inference (i.e., prediction1-prediction7), where every non-leaf node partitions input values into feature regions. For example, Node1 splits into two branches with one branch having the input value of f1=1 and the other having the input value f1=2. In a further embodiment, Node2 and Node4 respectively split into a plurality of leaf nodes utilizing respective determined cut-points (i.e., c20<f2<c21). Tree structure 300 is utilized by program 150 to calculate an inference from a set of input values.

Figure 5:
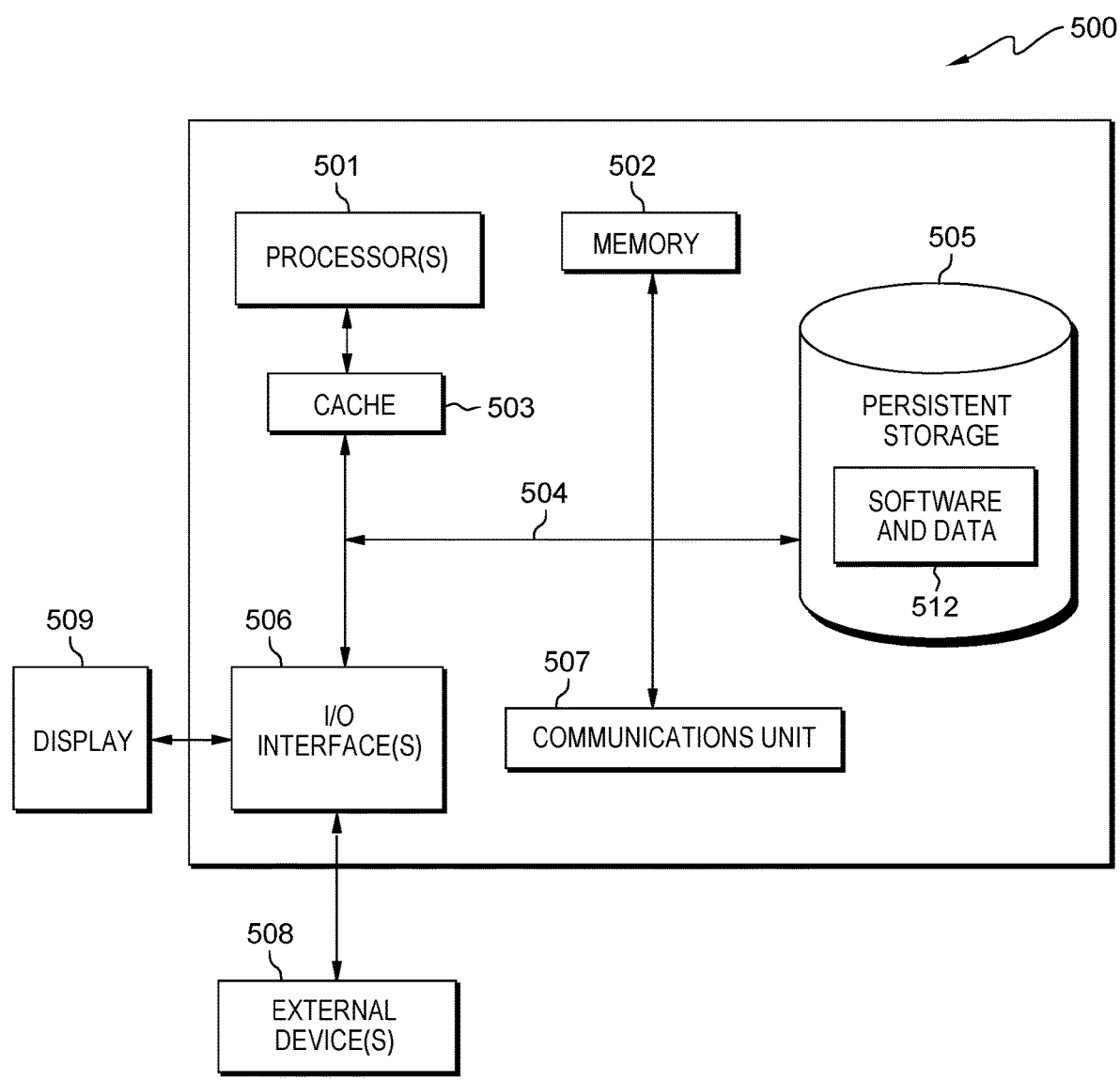
FIG. 5 is a block diagram of components of the server computer, in accordance with an embodiment of the present invention.

FIG. 4 depicts diagram containing self-learning tree structure 400 cached within inference cache 122, in accordance with an embodiment of the present invention. Self-learning tree structure 400 continues from tree structure 300 although tree structure 400 is dynamically adjusted based on continuously collected input values. Within tree structure 400, program 150 reduces nodes due to node inactivity, predictive inaccuracy, storage or computational limitations. For example, program 150 removes leaf Node9 with associated prediction5 due to a comparatively low confidence score and storage constraints requiring the tree structure consume less than 5 gigabytes. Additionally, program 150 adds or replaces a leaf node (i.e., Node12 with prediction8) as program 150 calculates accurate model predictions as described in step 208) Here, program 150 adds Node12 with prediction8 to tree structure 400 responsive to Node12 exceeding the model prediction confidence threshold as described in step 212. Additionally, prediction 8 is transmitted to a user and/or utilized in subsequent classifications or workloads. As program 150 continues to remove, replace, or add nodes, the overall accuracy and reliable of tree structure 400 increases. In an embodiment, program 150 balances the tree structure by re-splitting non-leaf nodes based on newly collected input values. Here, program 150 balances tree structure 400 such that program 150 keeps the height of tree structure logarithmically small for a sequence of node additions, replacements, and/or removals FIG. 5 depicts block diagram 500 illustrating components of server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 120 each include communications fabric 504, which provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of computer processor(s) 501 by holding recently accessed data, and data near accessed data, from memory 502.

Program 150 may be stored in persistent storage 505 and in memory 502 for execution by one or more of the respective computer processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 can be stored in persistent storage 505 for access and/or execution by one or more of the respective processors 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program 150 may be downloaded to persistent storage 505 through communications unit 507.

I/O interface(s) 506 allows for input and output of data with other devices that may be connected to server computer 120. For example, I/O interface(s) 506 may provide a connection to external device(s) 508, such as a keyboard, a keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 505 via I/O interface(s) 506. I/O interface(s) 506 also connect to a display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    calculating, by one or more computer processors, a cache prediction for a received inference request within an inference cache stored on a server and structured as a self-learning tree, wherein the inference request comprises a set of input values;
    responsive to the cache prediction exceeding a cache prediction threshold, retrieving, by one or more computer processors, the cache prediction from the inference cache;
    parallelly computing, by one or more computer processors, a model prediction for the received inference request utilizing a trained model;
    responsive to the model prediction exceeding a model prediction threshold, converting, by one or more computer processors, the trained model into a tree structure;
    updating, by one or more computer processors, the inference cache with the converted model, comprising:
        rebalancing the inference cache in response to storage limitations of the server, wherein rebalancing removes one or more nodes within the inference cache; and
    classifying, by one or more computer processors, one or more images based on a prediction associated with a highest confidence.

2. The computer-implemented method of claim 1, wherein the inference cache comprises a plurality of non-leaf nodes associated with a respective input split, wherein each non-leaf node in the plurality of non-leaf nodes is respectively associated a plurality of leaf nodes each associated with a prediction and confidence value.

3. The computer-implemented method of claim 2, wherein each input split partitions the input values into a plurality of feature regions.

4. The computer-implemented method of claim 1, wherein calculating the cache prediction for the received inference request within the inference cache structured as the self-learning tree, wherein the received inference request comprises the set of input values, comprises:
- calculating, by one or more computer processors, an input metadata similarity score based on a comparison of metadata associated with the set of input values and historical inputs stored in the inference cache;
- retrieving, by one or more computer processors, an inference associated with the historical inputs stored in the inference cache based on the calculated input metadata similarity score; and
- measuring, by one or more computer processors, a confidence score for the retrieved inference based on the calculated similarity between the input set and historical inputs contained in inference cache.

5. The computer-implemented method of claim 1, wherein the tree structure is a soft decision tree in which leaf nodes are assigned an inference probability and the leaf nodes contribute equally to the cache prediction.

6. The computer-implemented method of claim 2, further comprising:
- reducing, by one or more computer processors, one or more non-leaf or leaf nodes due to a respective selection from the group consisting of: node inactivity, prediction inaccuracy, storage limitations, and computational limitations.

7. The computer-implemented method of claim 1, wherein the trained model is a neural network.

8. A computer program product comprising:
one or more computer-readable storage media; and
program instructions stored on the one or more computer-readable storage media to perform operations comprising:
- calculating a cache prediction for a received inference request within an inference cache stored on a server and structured as a self-learning tree, wherein the inference request comprises a set of input values;
- responsive to the cache prediction exceeding a cache prediction threshold, retrieving the cache prediction from the inference cache;
- parallelly computing a model prediction for the received inference request utilizing a trained model;
- responsive to the model prediction exceeding a model prediction threshold, converting the trained model into a tree structure;
- updating the inference cache with the converted model, comprising:
  - rebalancing the inference cache in response to storage limitations of the server, wherein rebalancing removes one or more nodes within the inference cache; and
- classifying one or more images based on a prediction associated with a highest confidence.

9. The computer program product of claim 8, wherein the inference cache comprises a plurality of non-leaf nodes associated with a respective input split, wherein each non-leaf node in the plurality of non-leaf nodes is respectively associated a plurality of leaf nodes each associated with a prediction and confidence value.

10. The computer program product of claim 9, wherein each input split partitions the input values into a plurality of feature regions.

11. The computer program product of claim 8, wherein the calculating the cache prediction for the received inference request within the inference cache structured as the self-learning tree, wherein the received inference request comprises the set of input values, comprises:
- calculating an input metadata similarity score based on a comparison of metadata associated with the set of input values and historical inputs stored in the inference cache;
- retrieving an inference associated with the historical inputs stored in the inference cache based on the calculated input metadata similarity score; and
- measuring a confidence score for the retrieved inference based on the calculated similarity between the input set and historical inputs contained in inference cache.

12. The computer program product of claim 8, wherein the tree structure is a soft decision tree in which leaf nodes are assigned an inference probability and the leaf nodes contribute equally to the cache prediction.

13. The computer program product of claim 9, wherein the operations further comprise:
- reducing one or more non-leaf or leaf nodes due to a respective selection from the group consisting of: node inactivity, prediction inaccuracy, storage limitations, or computational limitations.

14. The computer program product of claim 8, wherein the trained model is a neural network.

15. A computer system comprising:
a processor set;
one or more computer-readable storage media; and
program instructions stored on the computer-readable storage media to cause the processor set to perform operations comprising:
- calculating a cache prediction for a received inference request within an inference cache stored on a server and structured as a self-learning tree, wherein the inference request comprises a set of input values;
- responsive to the cache prediction exceeding a cache prediction threshold, retrieving the cache prediction from the inference cache;
- parallel computing a model prediction for the received inference request utilizing a trained model;
- responsive to the model prediction exceeding a model prediction threshold, convert the trained model into a tree structure;
- updating the inference cache with the converted train model, comprising:
  - rebalancing the inference cache in response to storage limitations of the server, wherein rebalancing removes one or more nodes within the inference cache; and
- classifying one or more images based on a prediction associated with a highest confidence.

16. The computer system of claim 15, wherein the inference cache comprises a plurality of non-leaf nodes associated with a respective input split, wherein each non-leaf node in the plurality of non-leaf nodes is respectively associated a plurality of leaf nodes each associated with a prediction and confidence value.

17. The computer system of claim 16, wherein each input split partitions the input values into a plurality of feature regions.

18. The computer system of claim 15, wherein the calculating the cache prediction for the received inference request within the inference cache structured as the self-learning tree, wherein the received inference request comprises the set of input values, comprise:
- calculating an input metadata similarity score based on a comparison of metadata associated with the set of input values and historical inputs stored in the inference cache;

retrieving an inference associated with the historical inputs stored in the inference cache based on the calculated input metadata similarity score; and measuring a confidence score for the retrieved inference based on the calculated similarity between the input set and historical inputs contained in inference cache.

19. The computer system of claim 15, wherein the tree structure is a soft decision tree in which leaf nodes are assigned an inference probability and the leaf nodes contribute equally to the cache prediction.

20. The computer system of claim 16, wherein the operations further comprise:

reducing one or more non-leaf or leaf nodes due to a respective selection from the group consisting of: node inactivity, prediction inaccuracy, storage limitations, and computational limitations.

* * * * *